D. M. HOLLAND AND F. P. SWEEDEN.
POULTRY WATERING FOUNTAIN.
APPLICATION FILED AUG. 7, 1918.
1,325,640.
Patented Dec. 23, 1919.
2 SHEETS—SHEET 1.
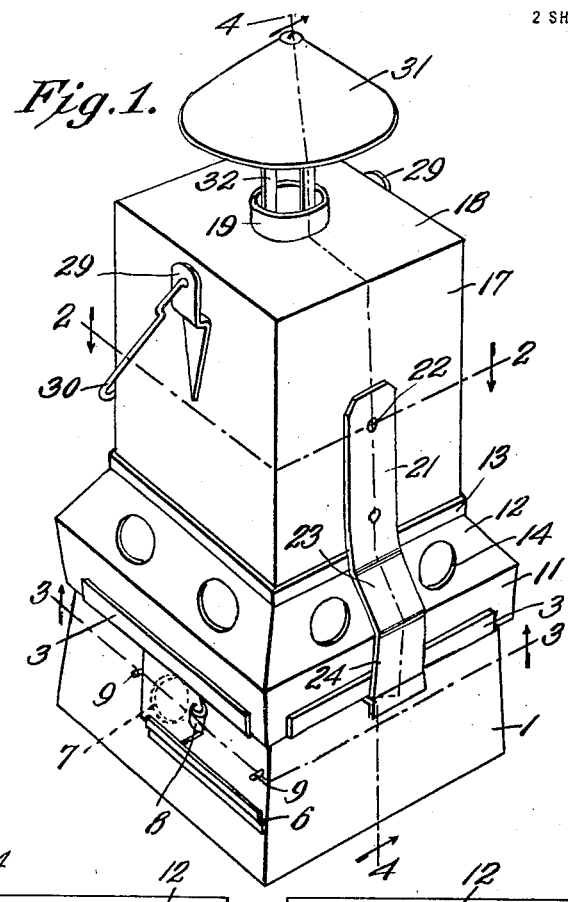
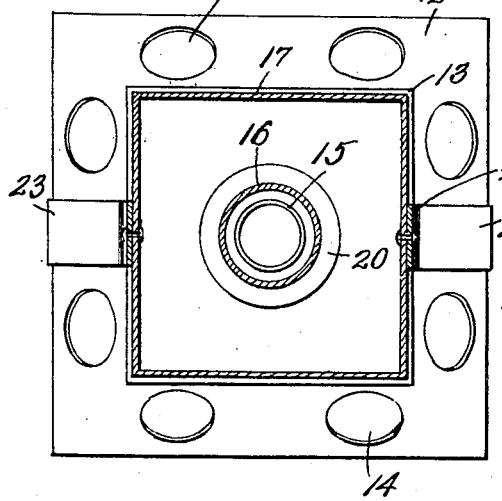
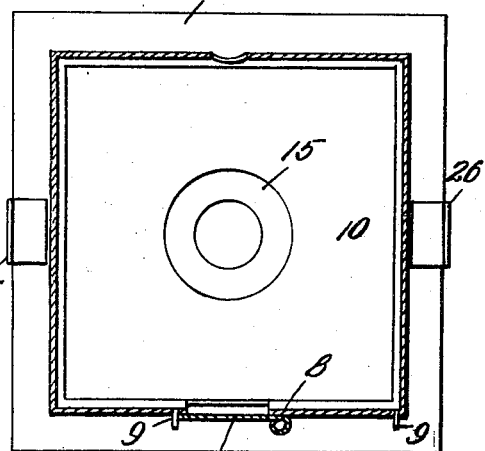
Witnesses
James F. Crown
J. P. Campbell
Inventor
Daniel M. Holland
Fred P. Sweeden,
By Richard B. Owen,
Attorney

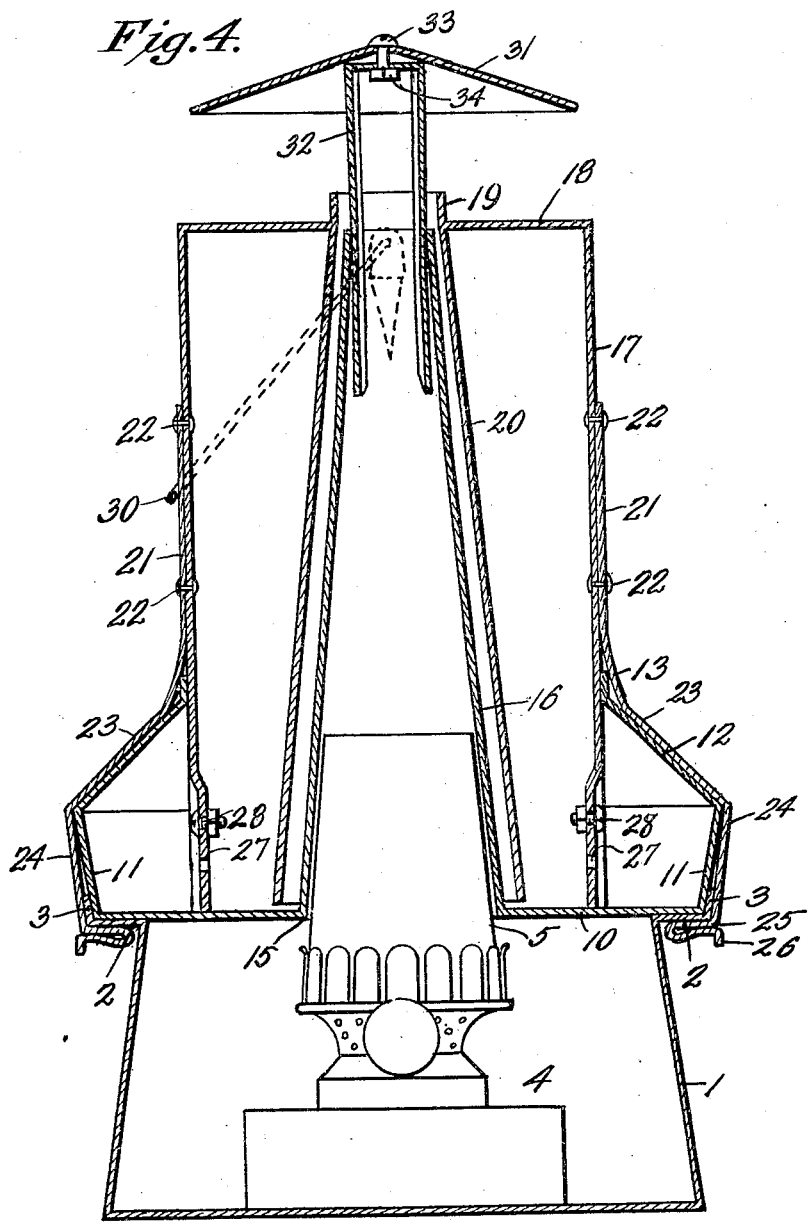

UNITED STATES PATENT OFFICE.

DANIEL M. HOLLAND AND FRED P. SWEEDEN, OF COUNCIL BLUFFS, IOWA.

POULTRY-WATERING FOUNTAIN.

1,325,640.

Specification of Letters Patent.

Patented Dec. 23, 1919.

Application filed August 7, 1918. Serial No. 248,737.

*To all whom it may concern:*

Be it known that we, DANIEL M. HOLLAND and FRED P. SWEEDEN, both citizens of the United States, both residing at Council Bluffs, in the county of Pottawattamie and State of Iowa, have invented certain new and useful Improvements in Poultry-Watering Fountains, of which the following is a specification.

Our invention relates to new and useful improvements in a watering fountain and more particularly to a poultry watering fountain.

The principal object of the invention is the provision of means for heating the water to prevent the same from freezing.

Another object is the construction of the fountain in sections whereby access may be easily gained thereto for regulating the heating element, filling the tank, or cleaning.

A further object is the provision of means whereby the fountain may be moved from place to place as well as a removable cap on the top of the heat passage.

With these and other objects in view our invention consists of a novel detail of construction and arrangement of parts as will be more clearly understood from the following specification and drawings in which:—

Figure 1 is a perspective.

Fig. 2 is a horizontal section on the line 2—2 of Fig. 1 looking in the direction of the arrows.

Fig. 3 is a horizontal section on the line 3—3 of Fig. 1 looking in the direction of the arrows, and Fig. 4 a vertical section on the line 4—4 of Fig. 1 looking in the direction of the arrows.

In the drawings the numeral 1 indicates a receptacle opened at top which forms the base of our fountain. As illustrated more particularly in Fig. 4 of the drawings the side walls of the receptacle are inclined and a flange 2 is formed at the top of each side and extends at right angles thereto. The vertical extension 3 is formed on the outer end of the flanges 2 for the purpose as will be later more particularly pointed out.

An oil burner 4 of any well known construction is received within the receptacle 1 and is provided with a chimney 5 of usual construction.

Guide strips 6 are secured to one side of the receptacle 1 in any suitable manner and are adapted to receive a sliding door indicated at 7, more particularly in Fig. 1 of the drawings which sliding door is adapted to cover an opening formed in the side of the receptacle. One end of the sliding door 7 is curled as indicated at 8 to form a handle whereby the door may be easily operated. Projections 9 are formed adjacent each end of the guide strips 6 for limiting the movement of the door. The opening which the sliding door covers is adapted for regulating the amount of air admitted to the receptacle for use in connection with the oil burner 4.

A trough is adapted to be received on the base and this trough comprises a base plate 10, a substantially vertical upstanding portion 11, and an extension 12 formed on the top of the upstanding portion 11. The extension 12 extends inwardly at an angle, and is provided on the top with a vertical flange 13 as is more particularly illustrated in Figs. 1 and 4 of the drawings. Openings 14 are formed in the extension 12, as more particularly illustrated in Figs. 1 and 2, for the purpose as will be presently described. The base plate 10 has a central opening 15 therein and an upstanding portion 16 is formed around the edge of the opening as is more particularly illustrated in Fig. 4 of the drawings and the chimney 5 of the burner 4 is adapted to pass through the opening 15 and be received in the upstanding portion 16. As illustrated the upstanding portion 16 converges toward the top.

A tank is adapted to be received in the trough and this tank comprises the side walls 17 and the top 18 having a central opening therethrough. The lower end of the tank is opened and is adapted to rest upon the base plate 10 as more particularly illustrated in Fig. 4 of the drawings. An upstanding flange 19 is formed around the central opening in the top plate 18 and a depending hood 20 is formed on the under side of the plate 18 and is adapted to overlie or encircle the upstanding portion 16 in spaced relation as is more particularly illustrated in Fig. 4 of the drawings. This hood 20 is flared as indicated.

Spring catches are secured to certain of the sides 17 for connecting the various sections of the fountain. These spring catches comprise strips 21 secured to the sides 17 by means of rivets 22 or other suitable fastening means. The lower ends of the strips 21 are formed with the angular extensions 23 adapted to engage the top of the portions 12 of the trough and the vertical depending portions 24 are adapted to engage the side of the trough as well as the flange 3 on the base section. The vertical portions 24 are bent at the lower end to form a right angle extension 25 which is adapted to extend beneath the flange 2 on the base 1. The extension 25 is then bent back upon itself and the end bent at a right angle as indicated at 26 to form a grip for the fingers whereby the catches may be operated. Vertically spaced openings 27 are formed in certain of the sides 17 of the tank, adjacent their lower ends, and those openings which are not to be used are adapted to be closed by means of a bolt 28 or other suitable form of plug. Ears 29 are secured to sides of the tank and are adapted to receive the bail indicated at 30.

A cap 31 is provided for the central opening through the top of the tank and this cap 31 has spring arms 32 connected to the lower side thereof by means of a screw 33 and nut 34. The spring arms 32 are adapted to be received in the opening as is more particularly illustrated in Figs. 1 and 4 of the drawings and the height of the cap from the top of the tank may be regulated by raising and lowering, the spring arms frictionally engaging the interior of the upstanding portion 16, will hold the cap in its adjusted position.

Having described the detailed construction of our invention it is thought that the advantages and manner of use will be clearly understood. When desiring to use the fountain the tank and trough portion are removed from the base by disengaging the members 25 on the spring arms 21 and when this has been done the lamp 4 may be lighted and left in the receptacle 1 in the position more clearly illustrated in Fig. 4 of the drawings. The tank is removed from the trough and inverted so that the open lower end will be up. Water may then be poured into the tank to any desired level just so long as it does not come above the end of the hood member 20. When the proper amount of water has been received in the tank the trough section is placed over the open end and the whole thing is then inverted so that the water will pass out through the openings 27 in the lower end of the tank. The water passing out through the openings will enter the trough section and the poultry may drink therefrom by inserting their heads through the openings 14 more particularly illustrated in Figs. 1 and 2 of the drawings. Of course, it will be understood that the spring catch members will hold the trough and tank together and after they have been inverted they may be placed upon the base receptacle 1 so that the trough rests upon the right angle extension 2 and the vertical upstanding portions 3 engage the sides of the trough. When placed in position upon the base the spring catches will engage beneath the right angle extension 2 and securely connect together the base section, trough, and tank. As previously described the chimney 5 of the oil burner 4 extends into the upstanding section 16 and this extension 16 in turn is received within the depending hood 20 whereby a continuous flow is formed for the heat and product of combustion. As stated in the detailed description the sliding door 7 may be opened or closed for regulating the amount of air received through the opening and at the same time the cap 31 may be adjusted thereby regulating the draft. The fountain may be moved from place to place by the bail 30.

From the above it will be seen that we have provided a poultry drinking fountain provided with a lamp for heating whereby the water in the fountain will not freeze in cold weather. It will also be seen that we have provided a fountain formed in sections whereby the sections may be disconnected for adjusting the heating element, for filling the tank, or for cleaning purposes. It will also be found that we have provided means whereby the sections may be securely connected together.

The foregoing description and the drawings have reference to what may be considered the preferred, or approved form of our invention. It is to be understood that we may make such changes in construction and arrangement and combination of parts, material, dimension, et cetera, as may prove expedient and fall within the scope of the appended claims.

Having fully described our invention what we claim as new and desire to secure by Letters Patent is:—

1. A drinking fountain comprising a base, having a right angle extension formed on the top thereof, a heater received in the base, a trough received on the right angle extension, a tank received on the trough, and means carried by the tank for connecting the base, trough and tank.

2. A drinking fountain comprising a base having a right angle extension formed on the top thereof, a trough received on the right angle extension, a tank received in the trough, and spring catches secured to the sides of the tank, extending over the edges of the trough, and engaging beneath the right angle extension of the base.

3. A drinking fountain comprising a receptacle forming a base, a flange formed on the top of the receptacle, and extending at a right angle thereto, an upstanding flange formed on the outer end of the first mentioned flange, a burner received in the receptacle, a trough received on the first mentioned flange and engaged by the second mentioned flange, a cover for the trough, said cover provided with a central opening and a plurality of openings therearound, a flue formed centrally of the trough and over the burner, a tank having its lower end received through the central opening in the trough, a depending hood formed on the interior of the tank and extending over and surrounding the flue of the trough, and a cap detachably connected to the tank over the depending hood.

4. A drinking fountain comprising a receptacle forming a base, a flange formed on the top of the receptacle, and extending at right angles thereto, an upstanding flange formed on the outer end of the first mentioned flange, a burner received in the receptacle, a trough received on the first mentioned flange and engaged by the second mentioned flange, a cover formed integral with the trough and provided with a central opening and a plurality of small openings therearound, an upstanding flange formed around the opening in the cover, a tapered flue formed centrally of the trough and over the burner, a tank having its lower end received through the opening in the cover of the trough and engaged by the upstanding flange, a tapered depending hood formed on the interior of the tank and extending over and surrounding the flue of the trough, and a detachable cap, said cap having spring arms adapted to be received in the end of the flue.

In testimony whereof we affix our signatures in presence of two witnesses.

DANIEL M. HOLLAND.
FRED P. SWEEDEN.

Witnesses:
T. L. McGarry,
G. N. Stodmeister.